(12) United States Patent
Daggett

(10) Patent No.: US 7,047,254 B2
(45) Date of Patent: May 16, 2006

(54) METHOD AND APPARATUS FOR PROVIDING AGGREGATE OBJECT IDENTIFIERS

(75) Inventor: Jeremy Daggett, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 463 days.

(21) Appl. No.: 10/284,246

(22) Filed: Oct. 31, 2002

(65) Prior Publication Data

US 2004/0088293 A1    May 6, 2004

(51) Int. Cl.
*G06F 17/30* (2006.01)
*G06F 17/00* (2006.01)
*G06F 7/00* (2006.01)

(52) U.S. Cl. .................. 707/103 Y; 707/2; 707/103 R; 707/102

(58) Field of Classification Search .................... 707/1, 707/2, 3, 4, 5, 100, 102, 103 R, 103 Y
See application file for complete search history.

(56) References Cited

U.S. PATENT DOCUMENTS

| | | | |
|---|---|---|---|
| 4,961,139 A * | 10/1990 | Hong et al. ..................... 707/1 |
| 5,199,073 A * | 3/1993 | Scott ........................... 711/216 |
| 5,388,213 A * | 2/1995 | Oppenheimer et al. ..... 709/245 |
| 5,490,258 A * | 2/1996 | Fenner ........................... 711/1 |
| 5,577,249 A * | 11/1996 | Califano ...................... 707/100 |
| 5,594,899 A * | 1/1997 | Knudsen et al. ............... 707/2 |
| 5,708,659 A * | 1/1998 | Rostoker et al. ............. 370/392 |
| 5,870,747 A * | 2/1999 | Sundaresan ............... 707/101 |
| 5,914,938 A * | 6/1999 | Brady et al. ................. 370/254 |
| 6,240,409 B1 * | 5/2001 | Aiken ............................. 707/4 |
| 6,643,636 B1 * | 11/2003 | Au et al. ........................ 707/2 |

OTHER PUBLICATIONS

Finkelstein et al. "Physical Database Design for Relational Databases", ACM Transactions on Database Systems, vol. 13, No. 1, Mar. 1988, pp. 91-128.*

(Continued)

*Primary Examiner*—Uyen Le
*Assistant Examiner*—Charles E. Lu

(57) ABSTRACT

A method and corresponding apparatus for providing aggregate object identifiers combine different database objects into one object to reference any other runtime objects. The method decreases object lookup time and total number of objects created, thus simplifying software codes that are necessary for a combination of objects to reference another object. Multiple maps are no longer necessary to refer to an object of interest, thus providing a more efficient mechanism for relating information in network databases. The aggregate object identifiers may operate in any JAVA® runtime environment in a storage area network (SAN).

17 Claims, 5 Drawing Sheets

OTHER PUBLICATIONS

Azarbayejani, NA et al. "Size Dependent Bit Shift Hashing Algorithm." IBM TDB. vol. 34, No. 10A, Mar., 1992. pp. 296-299.*

James, W et al. "Keyed File Hashing With Bit Rotation." IBM TDB. vol. 33, No. 3B, Aug., 1990. pp. 412-415.*

Maurer, WD et al. "Hash Table Methods." Computing Surveys, vol. 7, No. 1, Mar. 1975. pp. 5-19.*

Norton, R.M. et al. "A Probability Model for Overflow Sufficiency in Small Hash Tables." Communications of the ACM, Oct., 1985, vol. 28, No. 10, pp. 1068-1075.*

Jaeschke, G. "Reciprocal Hashing: A Method for Generating Minimal Perfect Hashing Functions." Communications of the ACM, Dec. 1981, vol. 24, No. 12, pp. 829-833.*

Leiserson, Charles E. "Introduction to Algorithms, Lecture 7." © 2001, 24 pages.*

* cited by examiner

METHOD AND APPARATUS FOR PROVIDING AGGREGATE OBJECT IDENTIFIERS

TECHNICAL FIELD

The technical field relates to database management systems, and, in particular, to aggregate object identifiers.

BACKGROUND

Faced with growing database storage needs, information technology (IT) departments are increasingly implementing networked storage, such as network-attached storage (NAS) and storage area networks (SANs), as well as direct-attach storage. Managing these heterogeneous and often distributed storage environments is typically a time-consuming manual task, requiring individual management of each storage device. In addition, the IT departments frequently experience "stranded" capacity, i.e., when one device cannot be accessed by applications that need the device, or capacity that is tied up in stale or wasted storage, resulting in inefficient resource utilization.

Managing large numbers of objects in database storage is a difficult and time-consuming task. Currently, large numbers of performance metric objects are managed using a brute force approach. The brute force approach uses multiple maps to access a particular object by descending down the maps until the object of interest is found. The mapping is done using a string name of the metric as a key in the map to the object of interest. Since devices may have subcomponents that have performance metrics to be managed as well, multiple mapping processes are needed to manage the sub-components, which can be time-consuming and inefficient. For example, if an object has configuration information for a particular metric on a particular switch for a particular port, three mapping processes are needed to access the object of interest, as illustrated below:

Metric1->Switch 1->Port 1->Configuration (object of interest)

SUMMARY

A method for providing aggregate object identifiers includes obtaining a plurality of objects from a database. Each of the plurality of objects contains an unique identifier. The method further includes creating an aggregate object identifier by combining the unique identifiers of the plurality of objects into a single object, and referencing one or more objects of interest in the database using the aggregate object identifier as a key.

A corresponding apparatus for providing aggregate object identifiers includes a retrieval module capable of obtaining a plurality of objects from a database. Each of the plurality of objects contains a unique identifier. The apparatus further includes a creating module capable of creating an aggregate object identifier by combining the unique identifiers of the plurality of objects into a single object, and a referencing module capable of referencing one or more objects of interest in the database using the aggregate object identifier as a key.

DESCRIPTION OF THE DRAWINGS

The preferred embodiments of the method and apparatus for providing aggregate object identifiers will be described in detail with reference to the following figures, in which like numerals refer to like elements, and wherein.

DETAILED DESCRIPTION

Figure 1A:
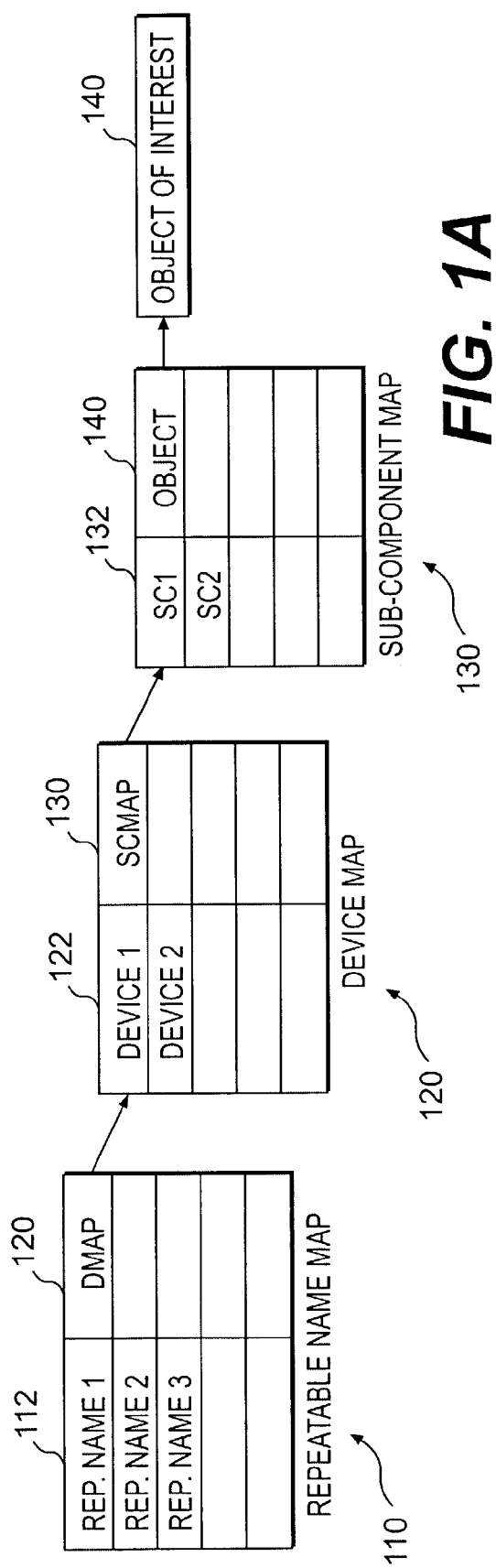
FIGS. 1A and 1B illustrate an exemplary aggregate object identifier map that combines multiple maps to refer to an object of interest using an exemplary aggregate object identifier.

A method and corresponding apparatus for providing aggregate object identifiers combine different database objects into one object to reference any other runtime objects. The method decreases object lookup time and total number of objects created, thus simplifying software codes that are necessary for a combination of objects to reference another object. Multiple maps are no longer necessary to refer to an object of interest, thus providing a more efficient mechanism for relating information in network databases. The aggregate object identifiers may operate in any JAVA® runtime environment in a storage area network (SAN).

The aggregate object identifiers may be implemented with a storage area manager (SAM) and a storage optimizer, such as the OPENVIEW® SAM and storage optimizer. The SAM supports enterprise storage utility services with integrated tools that help information technology (IT) departments reduce storage management costs, protect existing storage investments, efficiently utilize resources, and deliver guaranteed quality of service to customers, partners, and employees. The SAM enables system administrators to simplify and automate management of multivendor storage resources across disk, tape, direct-attach, and networked storage infrastructures. The SAM can also centrally manage and monitor availability, performance, usage, growth, and cost across a distributed enterprise. Further, the SAM enables system administrators to optimize resource utilization and operations, and to seamlessly integrate storage and storage services with the enterprise-wide IT service management system.

The storage optimizer may from a single management station monitor the performance of components on a storage network, including hosts, infrastructure and storage. The storage optimizer also collects data and provides a complete reporting structure for evaluating, monitoring and managing the quality and cost of IT services. System administrators can receive automatic notification of impending performance problems before the problems become serious, and can track performance of the system components over time. Therefore, the storage optimizer helps system administrators predict problems and improve efficiencies while optimizing investment in networked storage. The combination of performance monitoring, historical tracking, and trend analysis makes the storage optimizer a powerful tool for analyzing and upgrading storage infrastructure.

Database objects that are stored in databases typically include unique identifiers (long JAVA® data type). A database object may be referred to by the object's unique database identifier (Dbid). A Dbid is an abstraction of a row in a database table where the data exits. Exemplary database objects include repeatable name object, device object, and sub-component object. A repeatable name object typically identifies a unique name. A device object typically identifies a storage device or a host. A sub-component object is typically a storable object existing within the device object and depending on the type of device. For example, if the device is a switch, a sub-component may be a port of the switch.

An aggregate object identifier uniquely combines different database objects into a single object that can be used to manage large number of objects more effectively. The combination of the different objects typically refers to an object of interest, such as a baseline object. The baseline object is an object that contains data and methods necessary for predicting future performance data points based on past data points.

As a result of the creation of the single identifier, object creation may be reduced, and multiple maps are no longer necessary to refer to the object of interest. The aggregate object identifier may be guaranteed to be unique due to the nature of databases and database tables (described in detail later). The aggregate object identifier is described with respect to repeatable name object, device object, and sub-component object for illustration purposes only. One skilled in the art will appreciate that the aggregate object identifier may be used to relate any database object to an identifier.

Figure 1B:
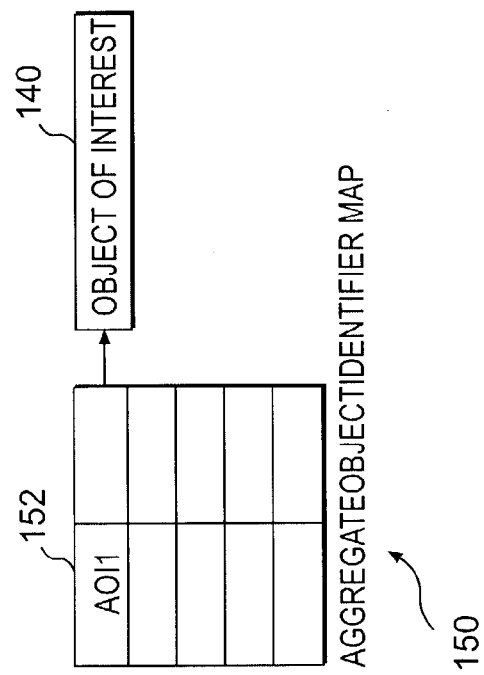

FIGS. 1A and 1B illustrate an exemplary aggregate object identifier map 150 that combines three maps, e.g., a repeatable name map 110, a device map 120 and a sub-component map 130, to achieve more efficient data access. Referring to FIG. 1A, three mapping processes are needed to access an object of interest 140. For example, a repeatable name map 110 maps repeatable name objects 112 to a particular device map 120, the device map 120 maps device objects 122 contained in the device map 120 to a particular sub-component map 130, and the sub-component map 130 maps sub-component objects 132 contained in the sub-component map 130 to the object of interest 140.

Referring to FIG. 1B, a aggregate object identifier map 150 combines the three maps 110, 120, 130 shown in FIG. 1A and uses one unique metric key, i.e., the aggregate object identifier (AOI) 152, as a generic key to reference the object of interest 140. In other words, the aggregate object identifier 152 uses a single indirection to refer to the object of interest 140 by encapsulating the unique identifiers of different objects into a single object. Single indirection to object is defined as a single access to an object in a map, such as a hash table or a hash map. The encapsulation may be performed during the creation of the aggregate object identifier 152 where the multiple database objects are obtained and stored within the aggregate object identifier 152.

Figure 2:
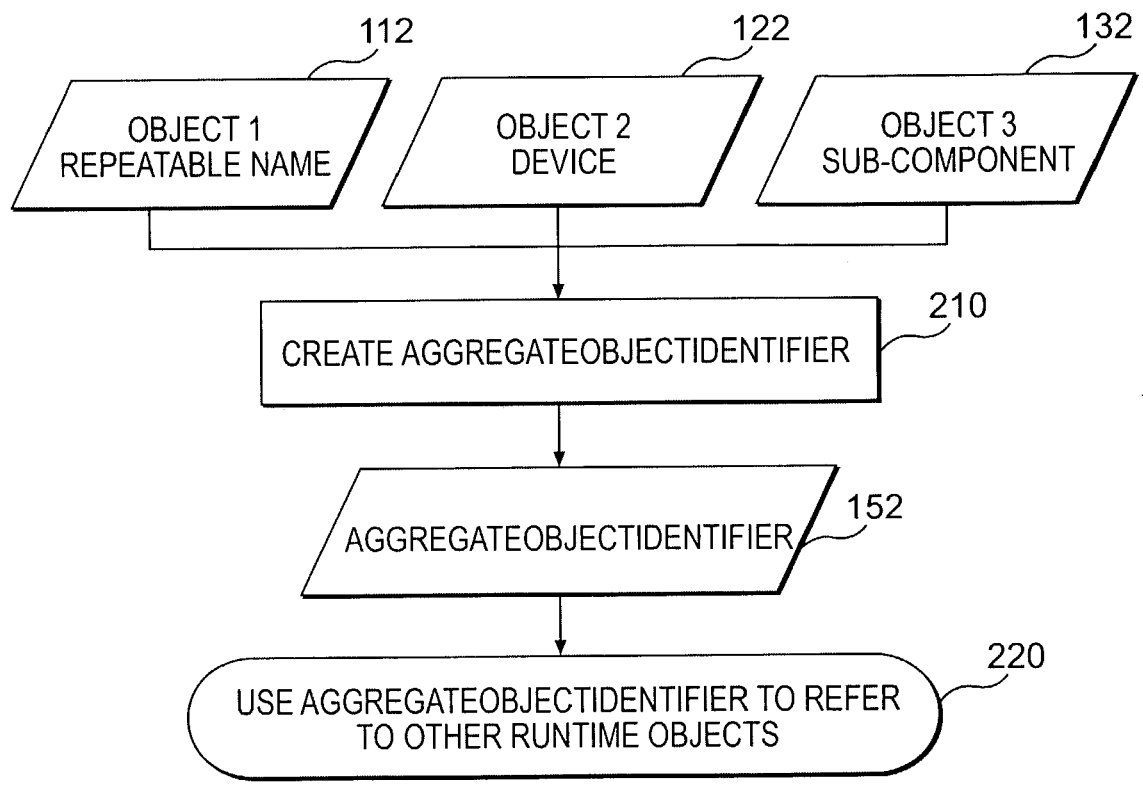
FIG. 2 illustrates an exemplary creation of the aggregate object identifier of FIG. 1.

FIG. 2 illustrates the creation of the aggregate object identifier 152 of FIG. 1B. Referring to block 210, the aggregate object identifier 152 may be created from multiple objects, such as the repeatable name object 112, the device object 122, and the sub-component object 132. Object maps, such as the maps 110, 120, 130 illustrated in FIG. 1A, may use hash codes to map objects to other objects.

The method for providing aggregate object identifiers creates the unique identifier 152 by constructing a new hash code from a combination of the multiple hash codes. The multiple objects 112, 122, 132 may be combined into one aggregate object identifier 152 using an equals method and a hash code method. Examples of the equals method and the hash code method are illustrated as follows. The exemplary equals method determines if the object is equivalent to another object, and returns true if the objects are indeed equal. The aggregate object identifier 152 in this example is named as "UniqueMetricKey".

```
public boolean equals(Object obj) {
    return (obj instanceof UniqueMetricKey &&
        (((UniqueMetricKey)obj).getRepNameDbid( ).equals(this.repNameId))&&
        (((UniqueMetricKey)obj).getDeviceDbid( ).equals(this.deviceId)) &&
        (((UniqueMetricKey)obj).getSubComponentDbid( ).equals(this.subCompId)));
} // equals(Object)
```

The exemplary hash code method calculates a hash code that is used by concrete map implementations for proper distribution in a map. The hash code method combines the multiple database objects 112, 122, 132 into one aggregate object identifier 152 and make the aggregate object identifier 152 unique at runtime. The calculation may include simple multiplications and additions of prime numbers with the hash codes of the multiple database objects 112, 122, 132. For example, the hash code for the aggregate object identifier 152 may be calculated by shifting the long value of the sub-component 132 to the right (zero propagate, zeros out the upper 8 bits) and filling the left-hand side with zeros, bit-wise exclusive or with the shifted value. Then, the result may be cast to an integer value and added to the results generated from the repeatable name object 112 and the device object 122.

```
public int hashCode( ){
    if (hashCode == 0) {
        int result = 17;
        result = 37 * result + repNameId.hashCode( );
        result = 37 * result + deviceId.hashCode( ),
        result = 37 * result + (int)(subCompId.longValue( ) ^
            (subCompId.longValue( ) >>> 8));
        hash Code = result;
    }
    return hashCode;
} // hash Code( )
```

By combining the three identifiers 112, 122, 132 into a single object, i.e., the aggregate object identifier 152, the hash code function is overridden in the aggregate object identifier class to produce a unique hash code that is then used as the key in the aggregate object identifier map 150. In the above example, the Object.hashCode( ) and Object.equals( ) methods are being overridden with altered behavior in AggregateObjectIdentifier.hashCode( ) and AggregateObjectIdentifier.equals( ).

Figure 3A:
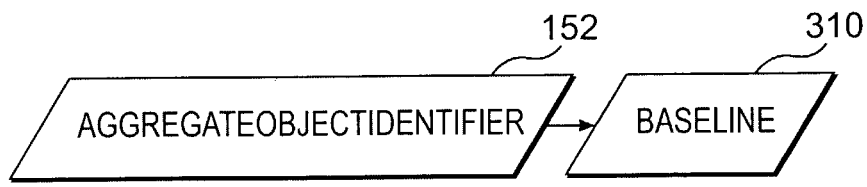
FIGS. 3A and 3B illustrate exemplary runtime objects of interest that can be referenced using the aggregate object identifier of FIG. 1.
Figure 3B:
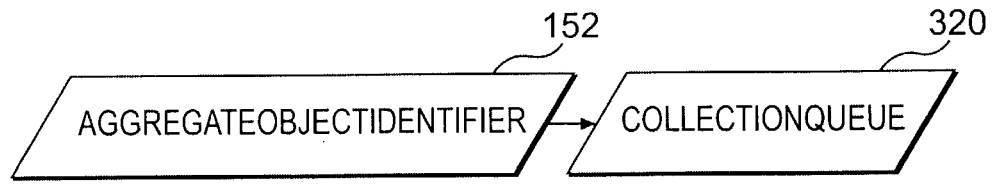

After creation, the aggregate object identifier 152 may be used to refer to any other runtime objects (block 220). FIGS. 3A and 3B illustrate exemplary runtime objects of interest 140 that can be referenced using the aggregate object identifier 152. Referring to FIGS. 3A and 3B, the aggregate object identifier 152 may use a single indirection to refer to a baseline object 310 or a collection queue object 320, respectively. Using the aggregate object identifier 152, only one mapping is needed to access a particular object of interest 140, such as the baseline object 310 or the collection queue object 320. For example, for a particular metric on a particular switch device with a particular port sub-component, an exemplary single indirection mapping is illustrated as follows:

Aggregate Object Identifier 1 (metric, switch, port)-
       >Configuration (object of interest)

Figure 3C:
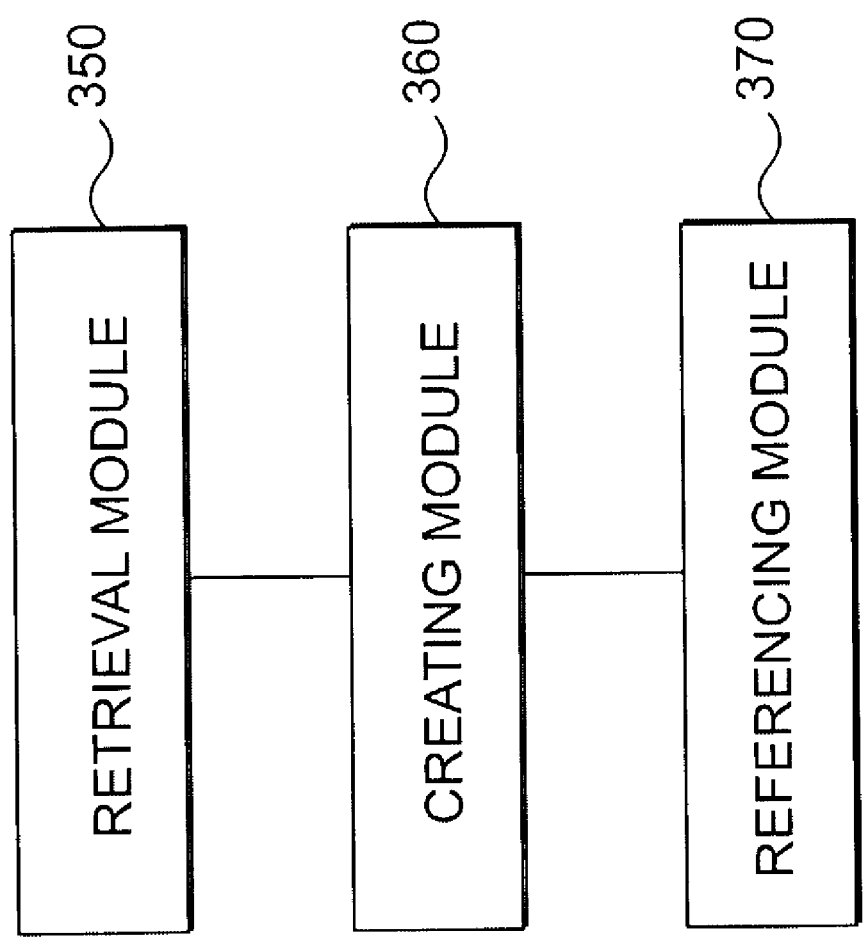
FIG. 3C illustrates exemplary software modules for providing the aggregate object identifiers of FIG. 1.

FIG. 3C illustrates exemplary software modules for providing the aggregate object identifiers of FIG. 1B. A retrieval module 350 may obtain a plurality of objects 112, 122, 132 from a database. A creating module 360 may create the aggregate object identifier 152 by combining unique identifiers of the plurality of objects 112, 122, 132 into a single object. A referencing module 370 may reference an object of interest 140 in the database using the aggregate object identifier 152 as a key.

Figure 4:
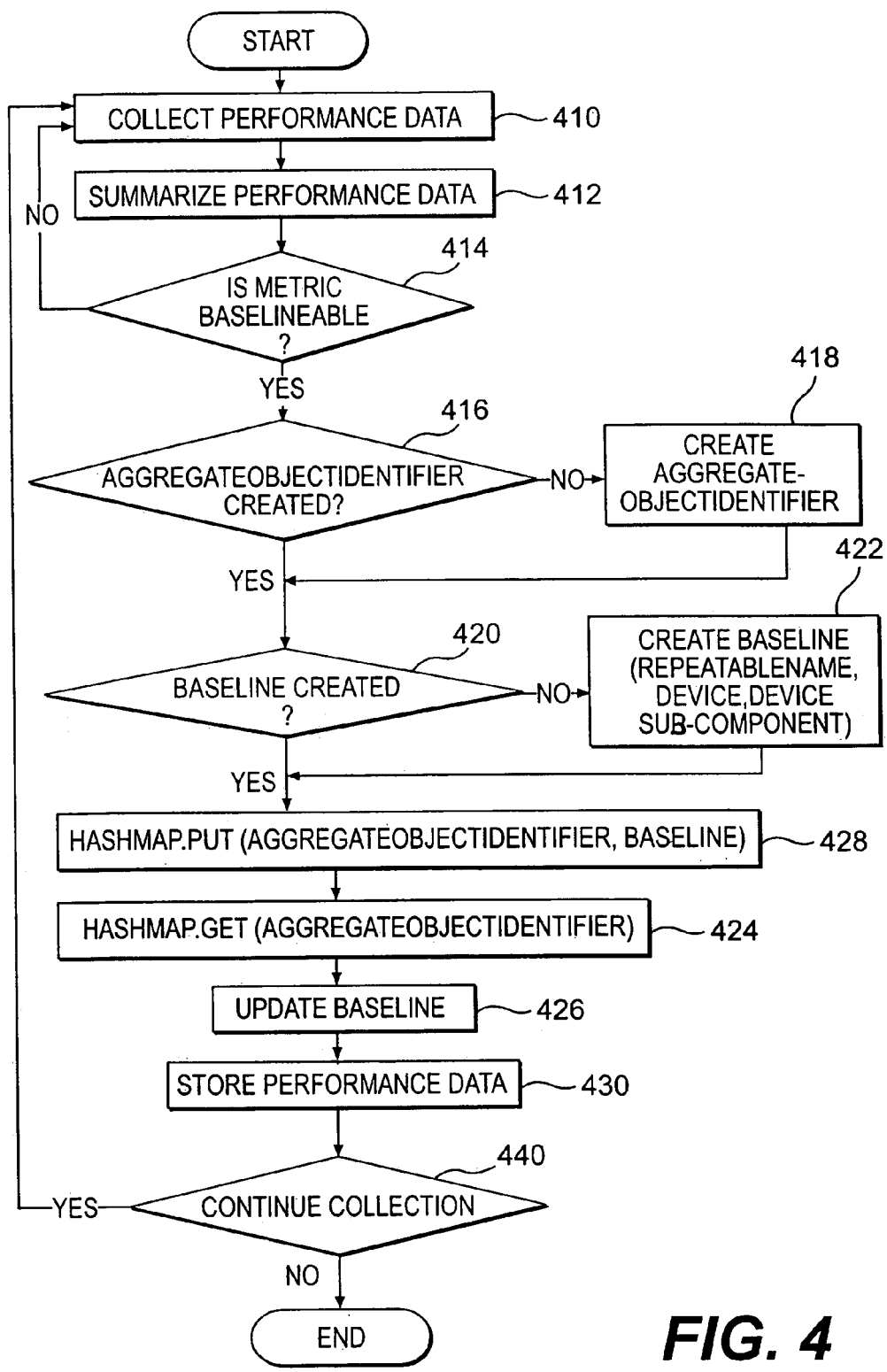
FIG. 4 is a flow chart illustrating an exemplary method of using the aggregate object identifier of FIG. 1 in an exemplary data collection framework.

FIG. 4 is a flow chart illustrating an exemplary method of using the aggregate object identifier 152 in an exemplary data collection framework. The aggregate object identifier 152 is described in FIG. 4 with respect to performance metrics management for illustration purposes only. One skilled in the art will appreciate that the aggregate object identifier 152 may be used to reference any runtime object.

Referring to FIG. 4, performance data may be collected (block 410) and summarized (block 412) in this example. Performance data may be collected from disparate devices in, for example, SANs. Examples of SAN devices include hosts, interconnect devices, and storage devices. A wide variety of performance metrics (data) may be available from each type of device. For example, on hosts, the storage optimizer can collect performance metrics for read and write rates for logical and physical volumes. On interconnect devices, the storage optimizer can collect device level and port level performance metrics for received and transmitted bytes and frames. Since every device is typically different, the metrics that can be collected may be device dependent.

Performance data may be collected at a specified time interval and then summarized (aggregated) into a single average point representing the data collected over a larger time interval. The summarization of the performance data may be accomplished using software code that is resident, for example, within an optimizer application. The data summarization module may collect raw performance data points over a discrete period. Then, the data summarization module may order the raw data points by a percentage of the time period during which the raw data points are collected. Next, the data summarization module may use weighted average calculation, for example, to convert the raw performance data points into a single summarized data point that is representative of the entire time interval. For example, if data are collected every 15 minutes, and the data are summarized every hour, then the single summarized point may represent the aggregate of the collected data points over that hour. After the collected performance data metrics are aggregated through the data summarization process (block 412), The data can be displayed to a user in charts and tables. The summarization process is described for illustration purposes only, and one skilled in the art will appreciate that other types of summarization calculation may be equally applied as well.

If the repeatable name object 112 is baselineable (block 414), the method proceeds to determine if the aggregate object identifier 152 and the baseline object 310 have been created (blocks 416, 420). Metrics that are baselineable are typically throughput and input or output related metrics. If, on the other hand, the repeatable name object 112 is not baselineable (block 414), the process goes back to collect more performance data (block 410).

If the aggregate object identifier 152 and the baseline object 310 have been created (blocks 416, 420), the method for providing aggregate object identifiers constructs a hash map and uses a put method to place the aggregate object identifier 152 and the baseline object 310 in the aggregate object identifier map 150 (block 428). The method may then use a get method to reference the aggregate object identifier 152 to an object of interest 140, e.g., the baseline object 310 (block 424). Thereafter, the baseline object 310 may be updated (block 426) with a new summarized performance data point in order to predict the next summarized data point. Next, the performance data may be stored in a secondary storage device 512 (shown in FIG. 5) (block 430). The method may then continue performance data collection (block 440) and return to block 410.

If the aggregate object identifier 152 is not created (block 416), the method creates the aggregate object identifier 152 (block 418), and proceeds to determine the status of the baseline object 310 (block 420). Similarly, if the baseline object 310 has not been created, the method creates the baseline object 310 (block 422). Examples of the baseline object 310 may include repeatable name objects 112, device objects 122, and sub-component objects 132.

Figure 5:
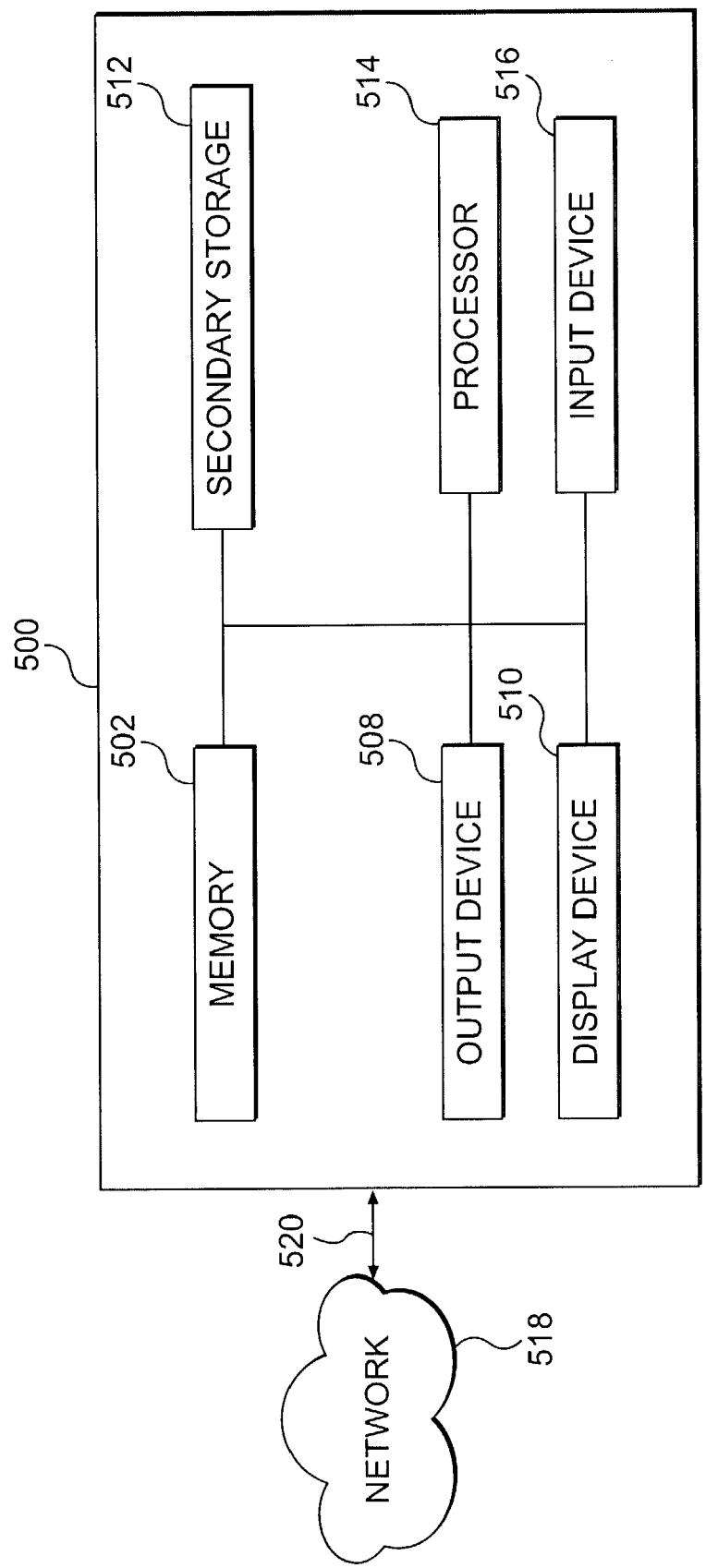
FIG. 5 illustrates exemplary hardware components of a computer that may be used in connection with the method for providing aggregate object identifiers.

FIG. 5 illustrates exemplary hardware components of a computer 500 that may be used in connection with the method for providing aggregate object identifiers. The computer 500 includes a connection 520 with a network 518 such as the Internet or other type of computer or telephone network. The computer 500 typically includes a memory 502, a secondary storage device 512, a processor 514, an input device 516, a display device 510, and an output device 508.

The memory 502 may include random access memory (RAM) or similar types of memory. The secondary storage device 512 may include a hard disk drive, floppy disk drive, CD-ROM drive, or other types of non-volatile data storage, and may correspond with various databases or other resources. The processor 514 may execute information stored in the memory 502, the secondary storage 512, or received from the Internet or other network 518. The input device 516 may include any device for entering data into the computer 500, such as a keyboard, keypad, cursor-control device, touch-screen (possibly with a stylus), or microphone. The display device 510 may include any type of device for presenting visual image, such as, for example, a computer monitor, flat-screen display, or display panel. The output device 508 may include any type of device for presenting data in hard copy format, such as a printer, and other types of output devices including speakers or any device for providing data in audio form. The computer 500 can possibly include multiple input devices, output devices, and display devices.

Although the computer 500 is depicted with various components, one skilled in the art will appreciate that the computer 500 can contain additional or different components. In addition, although aspects of an implementation consistent with the method for providing aggregate object identifiers are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer 500 to perform a particular method.

While the method and apparatus for providing aggregate object identifiers have been described in connection with an exemplary embodiment, those skilled in the art will understand that many modifications in light of these teachings are possible, and this application is intended to cover any variations thereof.

What is claimed is:

1. A method for providing aggregate object identifiers, comprising:
   obtaining a plurality of objects from a database, wherein each of the plurality of objects contains an unique identifier, wherein the plurality of objects refer to an object of interest using multiple database maps;
   creating an aggregate object identifier by combining multiple unique identifiers of the plurality of objects into a single object and multiplying and adding prime numbers with hash codes of the plurality of objects, the creating step including:
      performing a calculation on a first object by shifting a long value of the first object to the right and filling a left-hand side with zeros, the calculation generating a result on the first object;
      casting the result on the first object to an integer value; and
      adding the result on the first object to results generated from calculations on other objects;
   combining the multiple database maps into a single map, wherein the single map includes the aggregate object identifier as a single unique metric key; and
   referencing the object of interest in the database using the aggregate object identifier as the single unique metric key, wherein the aggregate object identifier uses a single indirection to refer to the object of interest without the need to use the multiple database maps.

2. The method of claim 1, further comprising referencing one or more baseline objects.

3. The method of claim 1, further comprising referencing one or more collection queue objects.

4. The method of claim 1, further comprising using a get method to reference the one or more objects of interest.

5. The method of claim 1, further comprising using a put method to reference the one or more objects of interest.

6. The method of claim 1, further comprising using an equals method and a hash code method to create the aggregate object identifier.

7. The method of claim 1, further comprising obtaining a repeatable name object, a device object, and a sub-component object from the database.

8. An apparatus for providing aggregate object identifiers, comprising:
   a retrieval module capable of obtaining a plurality of objects from a database, wherein each of the plurality of objects contains a unique identifier, and wherein the plurality of objects refer to an object of interest using multiple database maps;
   a creating module capable of creating an aggregate object identifier by combining multiple unique identifiers of the plurality of objects into a single object and multiplying and adding prime numbers with hash codes of the plurality of objects, wherein the creating module performs a calculation on a first object by shifting a long value of the first object to the right and filling a left-hand side with zeros to generate a result on the first object, casts the result on the first object to an integer value, and adds the result on the first object to results generated from calculations on other objects;
   a combining module capable of combining the multiple database maps into a single map, wherein the single map includes the aggregate object identifier as a single unique metric key; and
   a referencing module capable of referencing the object of interest in the database using the aggregate object identifier as a the single unique metric key, wherein the aggregate object identifier uses a single indirection to refer to the object of interest without the need to use the multiple database maps.

9. The apparatus of claim 8, wherein the referencing module references one or more baseline objects.

10. The apparatus of claim 8, wherein the referencing module references one or more collection queue objects.

11. The apparatus of claim 8, wherein the referencing module uses a get method to reference the one or more objects of interest.

12. The apparatus of claim 8, wherein the referencing module uses a put method to reference the one or more objects of interest.

13. The apparatus of claim 8, wherein the creating module uses an equals method and a hash code method to create the aggregate object identifier.

14. The apparatus of claim 8, wherein the retrieval module obtains a repeatable name object, a device object, and a sub-component object from the database.

15. A computer readable medium providing instructions for providing aggregate object identifiers, the instructions comprising:
   obtaining a plurality of objects from a database, wherein each of the plurality of objects contains an unique identifier, wherein the plurality of objects refer to an object of interest using multiple database maps;
   creating an aggregate object identifier by combining multiple unique identifiers of the plurality of objects into a single object and multiplying and adding prime numbers with hash codes of the plurality of objects, the creating step including:
      performing a calculation on a first object by shifting a long value of the first object to the right and filling a left-hand side with zeros, the calculation generating a result on the first object;
      casting the result on the first object to an integer value; and
      adding the result on the first object to results generated from calculations on other objects;

combining the multiple database maps into a single map, wherein the single map includes the aggregate object identifier as a single unique metric key; and referencing the object of interest in the database using the aggregate object identifier as the single unique metric key, wherein the aggregate object identifier uses a single indirection to refer to the object of interest without the need to use the multiple database maps.

16. The computer readable medium of claim 15, further comprising instructions for referencing one or more baseline objects.

17. The computer readable medium of claim 15, further comprising instructions for referencing one or more collection queue objects.

* * * * *